(12) United States Patent
Brinn

(10) Patent No.: US 8,696,513 B2
(45) Date of Patent: Apr. 15, 2014

(54) TRANSMISSION

(76) Inventor: Herbert P. Brinn, Kalamazoo, MI (US)

( * ) Notice: Subject to any disclaimer, the term of this patent is extended or adjusted under 35 U.S.C. 154(b) by 248 days.

(21) Appl. No.: 13/425,463

(22) Filed: Mar. 21, 2012

(65) Prior Publication Data
US 2013/0274057 A1    Oct. 17, 2013

(51) Int. Cl.
*F16H 3/08*    (2006.01)
(52) U.S. Cl.
USPC .......................................... 475/286; 475/303
(58) Field of Classification Search
USPC .................... 475/286, 303, 320, 326; 74/335
See application file for complete search history.

(56) References Cited

U.S. PATENT DOCUMENTS

| | | | | | |
|---|---|---|---|---|---|
| 653,633 | A | * | 7/1900 | Waltonbaugh | 475/286 |
| 715,078 | A | * | 12/1902 | Jeffs | 475/320 |
| 721,736 | A | * | 3/1903 | Osborn | 475/286 |
| 3,426,623 | A | * | 2/1969 | Randle | 475/159 |
| 4,063,470 | A | * | 12/1977 | Kelbel | 475/320 |
| 6,609,993 | B2 | * | 8/2003 | Ohkubo et al. | 475/331 |
| 8,360,926 | B2 | * | 1/2013 | Lauwers | 475/322 |
| 2008/0194375 | A1 | * | 8/2008 | Voigt et al. | 475/296 |

* cited by examiner

*Primary Examiner* — Roger Pang

(57) ABSTRACT

A racing transmission that is lightweight and simplistic. The racing transmission features a low gear, reverse gear, neutral and a direct drive gear. The transmission utilizes a drive shaft, a set of planetary and sun gears. The transmission disclosed herein does not use a countershaft to accomplish low and reverse.

3 Claims, 13 Drawing Sheets

TRANSMISSION

BACKGROUND OF THE INVENTION

Transmissions are not new to the art. However, the present invention has many advantages not available in prior art devices. The instant device is much simpler than prior art devices. Prior art transmissions for oval track racing have been modified versions of either automotive standard shift transmissions or automotive automatic shift transmissions. Some prior art transmissions have been developed for racing in recent years but are designed with countershafts to allow reverse and the use of lower gears.

Modified automatic transmissions do not use a countershaft but are typically bulky and heavy as well as unreliable. The device of the present invention allows for the elimination of the countershaft in a manual transmission and allows for a much lighter transmission. The device of the present invention also allows for the transmission to be used in direct drive without any power being applied to the gear train which also increases performance, durability and reliability. A lighter more durable transmission allows the user to be more competitive in the oval track arena.

THE INVENTION

The present invention is an automotive transmission that has a housing. Supported within the housing is a drive shaft that comprises an input shaft and an output shaft. The drive shaft is driven by a power source.

There is a forward dog ring slidably mounted on the drive shaft. Also present is a first gear housing, and contained in the first gear housing is a planetary gear housing and carrier. Within the planetary gear housing is a planetary gear comprising a central sun gear rotatably mounted on the input shaft. Surrounding this sun gear are at least three planet gears. The planetary gear housing and carrier are covered by a circumferential first ring gear that has internal surface gears that mesh with the planet gears.

The planetary gear set is activated by a first hydraulically driven control valve and cylinder that applies a first band on the low gear drum that incorporates the planetary ring gear, providing low gear.

The planetary gear set is activated by a second hydraulically driven control valve and cylinder that applys a second band on the reverse gear drum that incorporates the planetary carrier, providing reverse gear.

The front dog ring engages the planetary sun gear to drive the planetary gear set when the reverse or low gear is selected. The front dog ring is driven by the input shaft. The front dog ring disengages when direct drive is selected bypassing the planetary gear set.

There is a rear dog ring slidably mounted on the output shaft and further driving the output shaft. The rear dog ring is activated by the shift lever selecting low gear position, reverse gear position, neutral position and direct drive position.

When the direct drive position is selected the rear dog ring is disengaged from the planetary gear set or out of mesh.

Also included are a valve rod that has a distal end and a near end. There is also a shift rod with a near and distal end. The shift rod is comprised of an inner shaft having a middle portion and an outer shell. The valve rod and shift rod are fixedly attached to each other near the respective near ends.

The valve rod has predetermined nodules along an outside surface. The shift rod outer shell rod is spring biased near the distal end.

The outer shell of the shift rod has a first shift fork assembly mounted at the distal end. The shift fork of the first shift fork assembly is engaged to the forward dog ring.

The inner shaft of the shift rod has mounted near the middle portion, a second shift fork assembly, and the shift fork of the second shift fork assembly is engaged to the rearward dog ring.

There is a first poppet valve that is activated by the positioning of the valve rod nodules for controlling the flow of hydraulic fluid to the circumferential first band cylinder, and a second poppet valve for controlling the flow of hydraulic fluid to the circumferential second band.

DETAILED DESCRIPTION OF THE DRAWINGS

Figure 1:
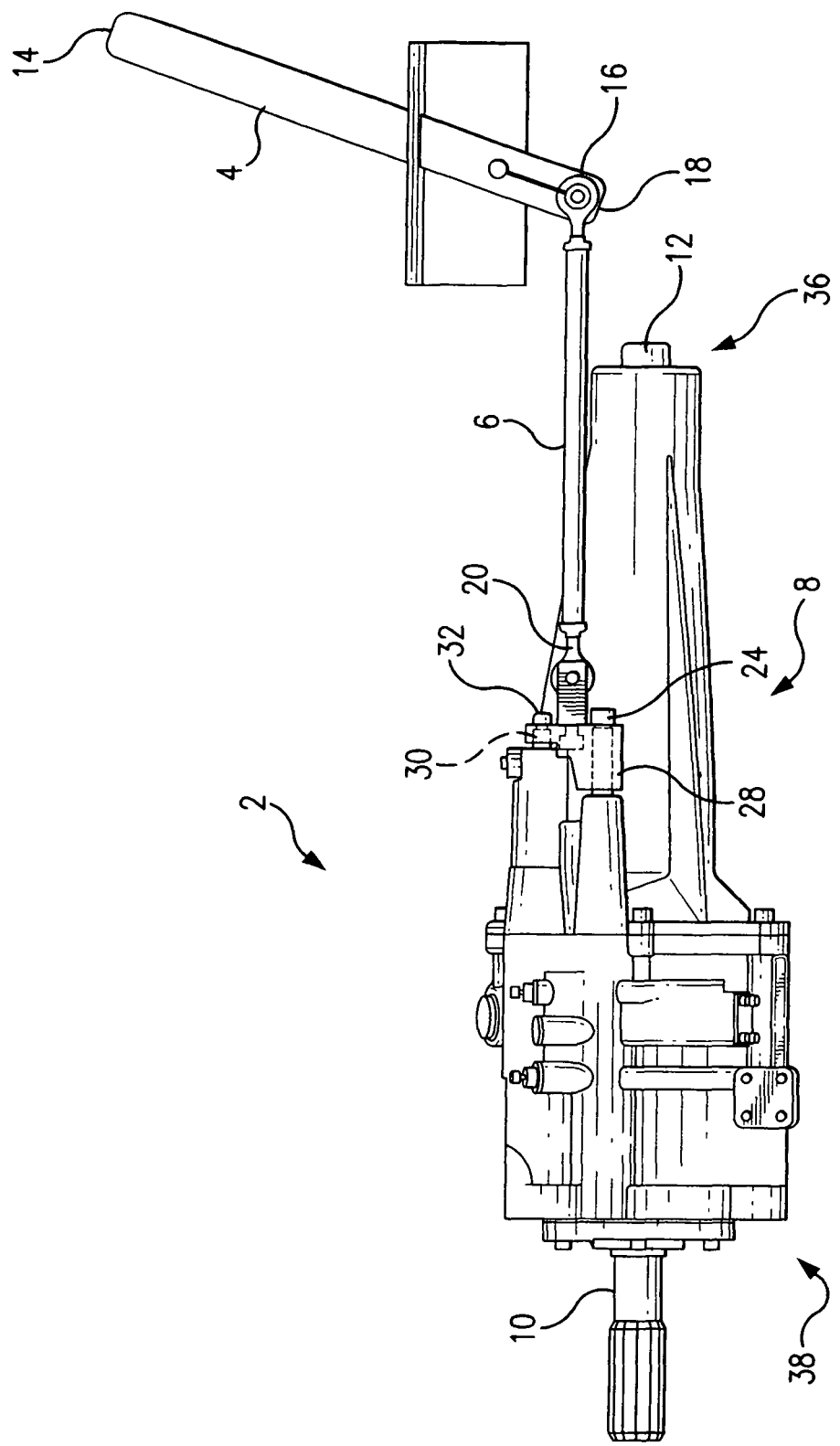
FIG. 1 is a full side view of a transmission of the present invention with direct drive selected.

FIG. 1 shows the transmission 2 of the present invention with direct drive selected. This embodiment is the preferred embodiment. Shown therein is the outer housing 8 that contains the working components of the transmission 2. The shifter 4 is in the direct drive position in this Figure. The shifter 4 has a near end 14 and a distal end 16. The distal end 16 of the shifter 4 is attached to the near end 18 of the shift linkage 6. The distal end 20 of the shift linkage 6 is attached to a coupler 28. This coupler 28 is crucial in that it connects to both the near end 24 of the valve rod 22 and the near end 32 of the shift rod 30. This coupling 28 allows the valve rod 22 and the shift rod 30 to act in tandem and they are capable of being timed. The utility is that when the shifter 4 is manipulated it acts upon both the valve rod 22 and the shift rod 30 at the same time.

Another embodiment shows the valve function completely separated with its operation done manually. For example the valve selection is controlled by a separate manipulation of another rod, instead of the rods being coupled.

Still another embodiment is the shifter operating the valve feature.

Still another embodiment is the valve function operating electronically either triggered by the shift rod or triggered manually.

Also shown in this Figure are the input shaft 10 at the distal end 38 of the transmission 2 and the output shaft 12 at the near end 36 of the transmission 2.

Figure 2:
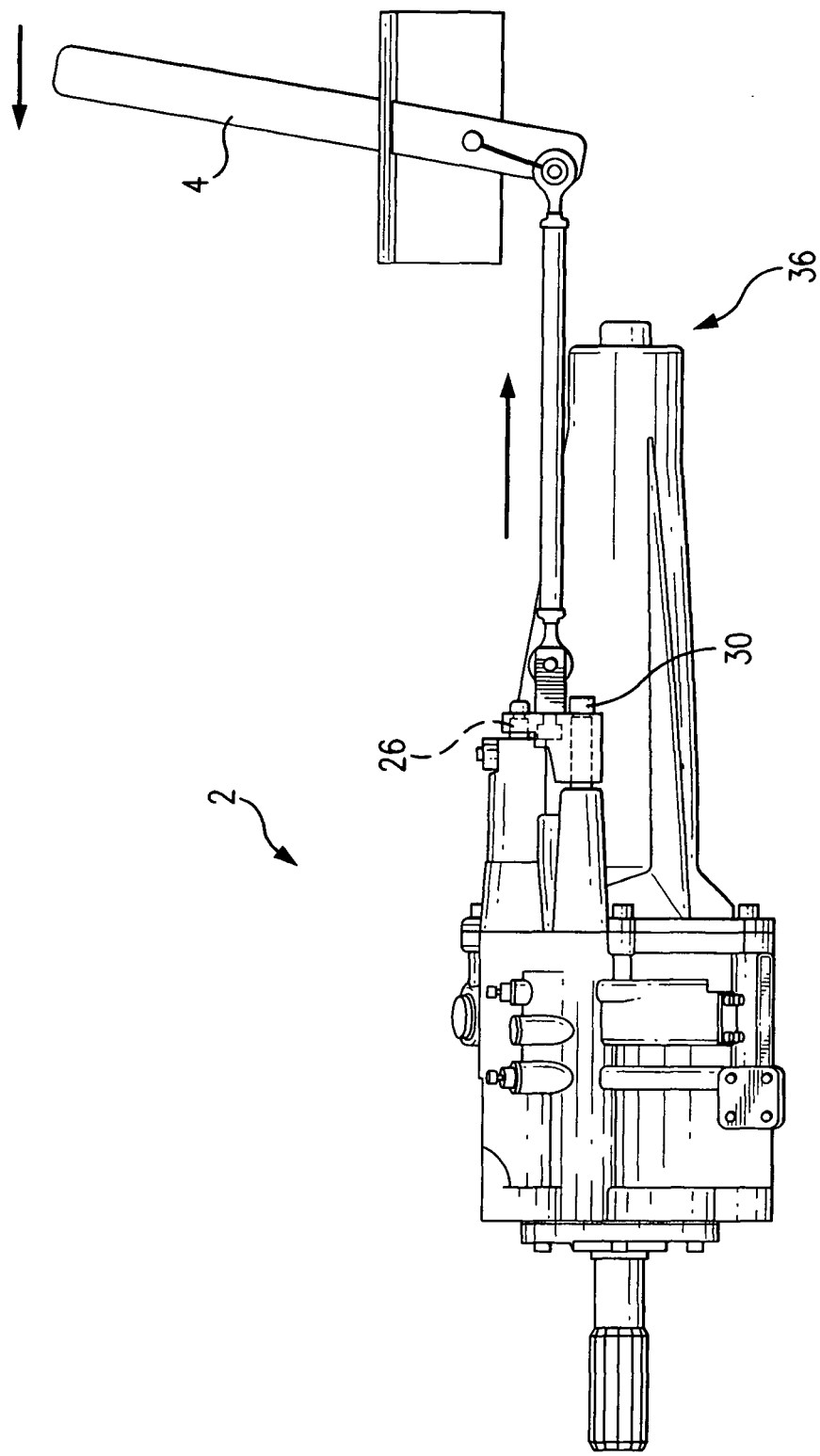
FIG. 2 is a full side view of a transmission of the present invention with neutral selected.

FIG. 2 shows the transmission 2 of the present invention with neutral selected. The shifter 4 is just slightly ahead or forward of the position represented in FIG. 1. This movement moves both the valve rod 22 and the shift rod 30 toward the near end 36 of the transmission 2.

Figure 3:
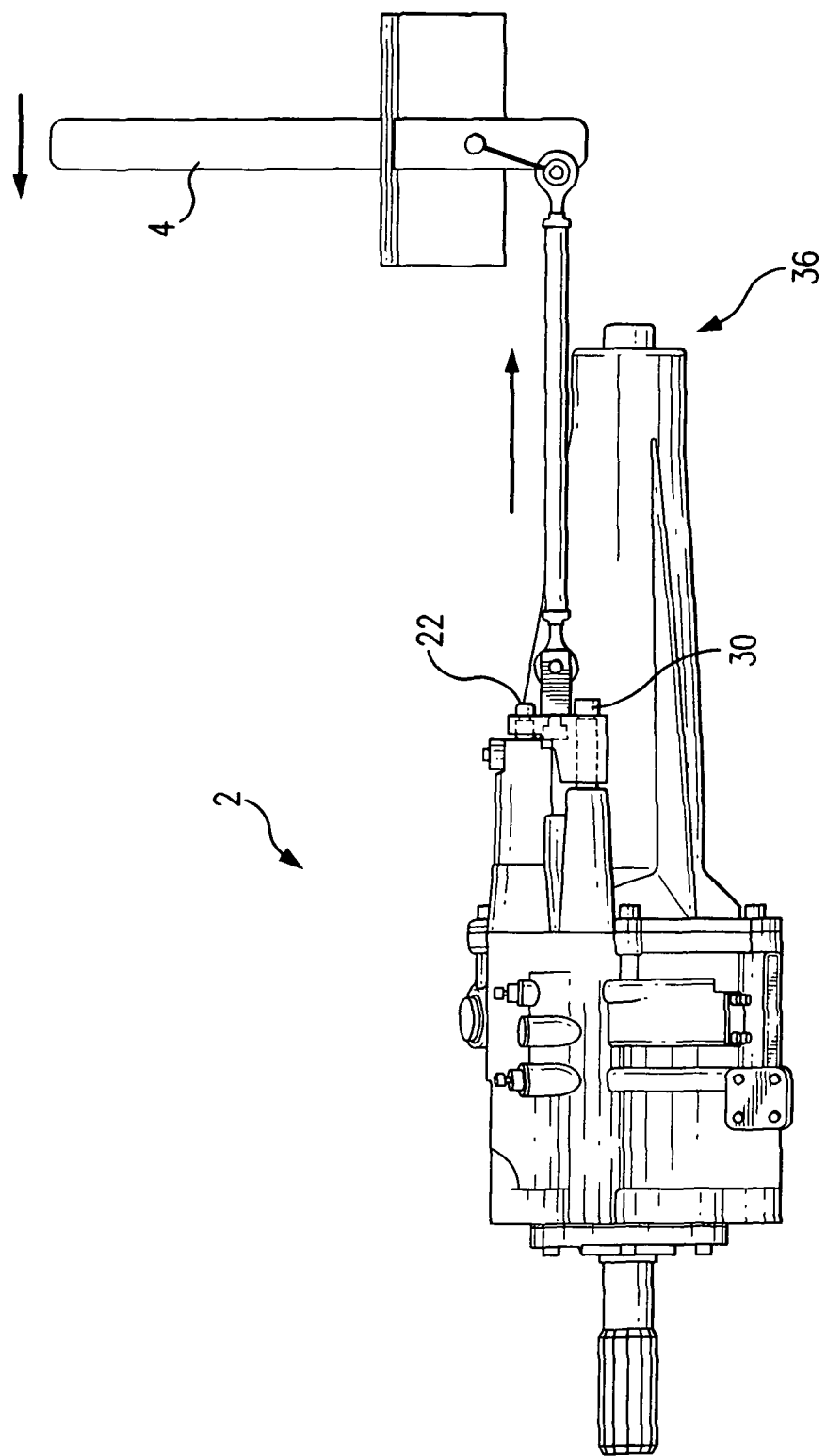
FIG. 3 is a full side view of a transmission of the present invention with low gear selected.

FIG. 3 shows the transmission 2 of the present invention with low gear selected. The shifter 4 is just slightly ahead or forward of the position represented in FIG. 2. This movement moves both the valve rod 22 and the shift rod 30 toward the near end 36 of the transmission 2.

Figure 4:
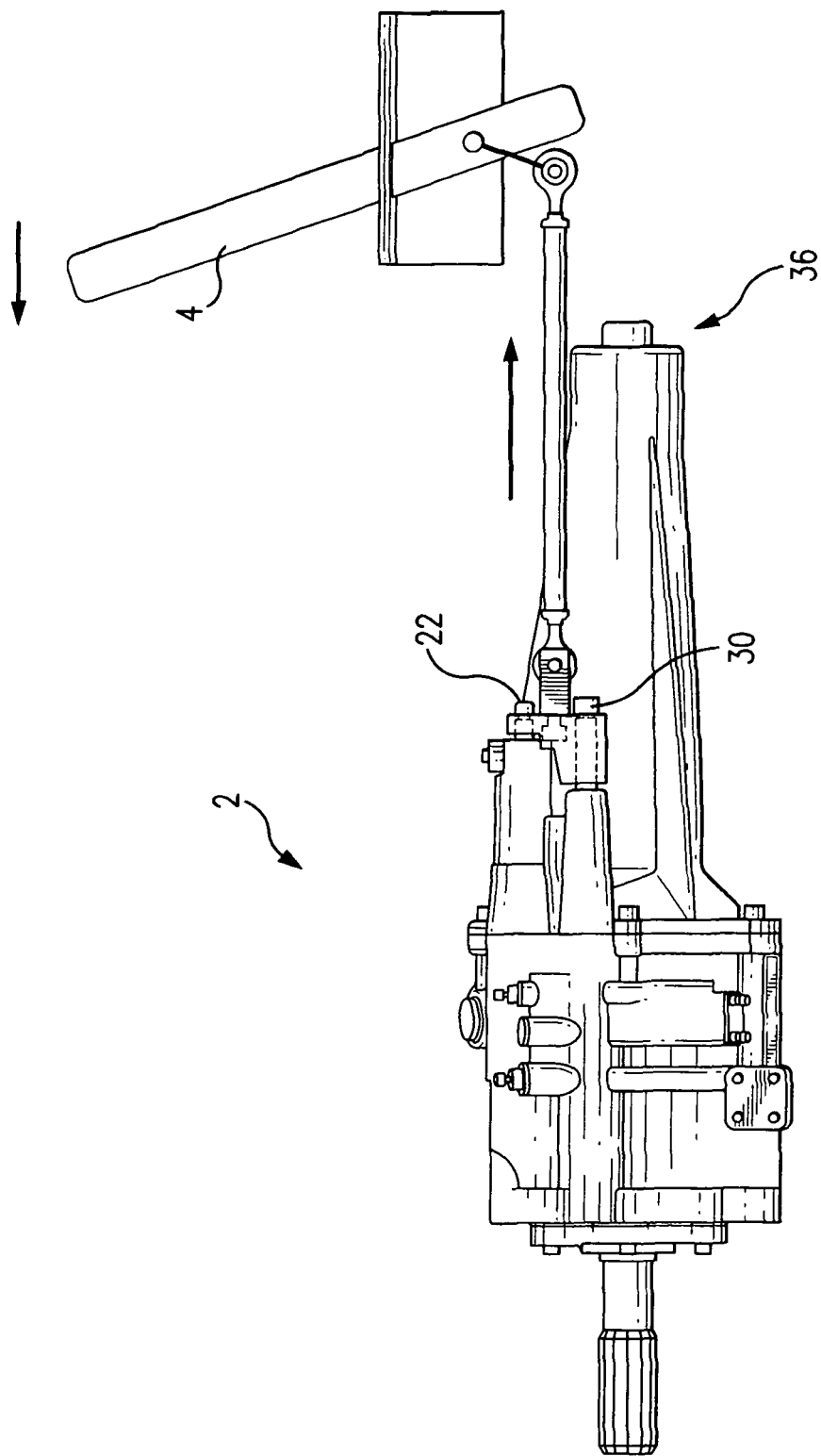
FIG. 4 is a full side view of a transmission of the present invention with reverse selected.

FIG. 4 shows the transmission 2 of the present invention with reverse selected. The shifter 4 is just slightly ahead or forward of the position represented in FIG. 3. This movement moves both the valve rod 22 and the inner shift rod 68 toward the near end 36 of the transmission 2.

Figure 5:
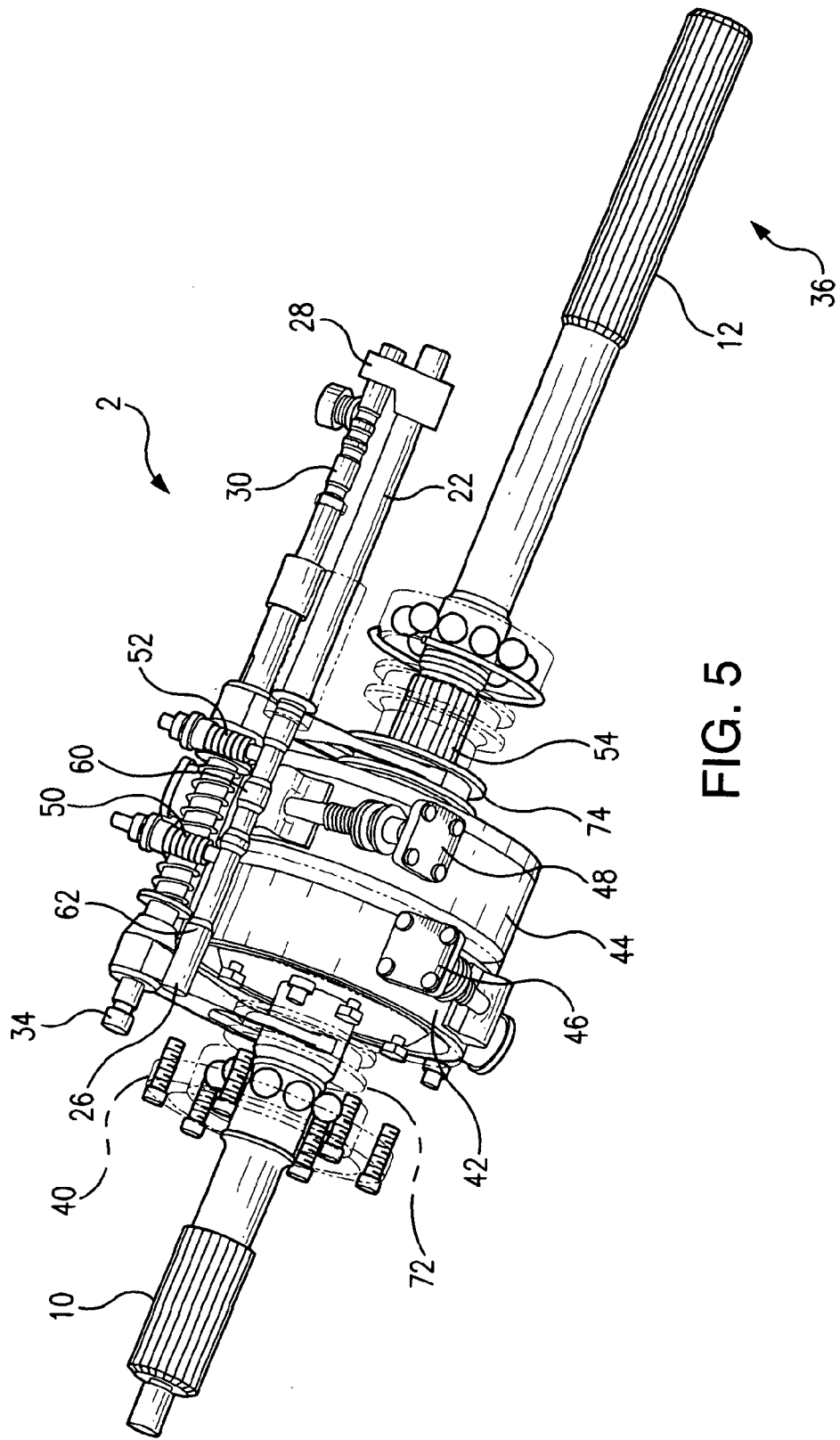
FIG. 5 is a view in perspective showing the internal operating features of the transmission of this invention.

FIG. 5 shows the internal operating features of the transmission 2. This Figure shows the transmission 2 in direct drive. One skilled in the art can determine that the transmission 2 is in direct drive based on the location of the valve rod 22 nodules 60 and 62 and the shift rod 30. This aspect is critical to the invention because the valve rod 22 actives the poppet valves 50 and 52 based on its location under one or the other or neither of the poppet valves 50 and 52. When the shifter 4 (not shown) is moved forward it forces the valve rod 22 and the shift rod 30 to move backward toward the near end 36 of the transmission 2.

This movement places the reverse nodule 62 under the reverse poppet valve 50 and places the rear dog ring 74 in the reverse position. When the reverse poppet valve 50 is activated it directs hydraulic pressure to the reverse cylinder 46 which in turn activates the reverse band 42 engaging or locking the planetary carrier 82 (not shown here) forcing the planetary ring gear 64 to run in reverse and drive the rear dog ring 74 and output shaft 12 in reverse, therefore driving the transmission 2 and the vehicle it is placed into in reverse.

On the contrary if the nodule 60 activates the low poppet valve 52 it hydraulically directs pressure to the low cylinder 48 activating the low band 44 locking or engaging the planetary gear ring 64 forcing the transmission 2 into forward and driving the rear dog ring 74 and output shaft 12 in forward, therefore driving the vehicle that it is placed into in a forward direction in a low gear.

When the nodules 60 and 62 are not activated neither of the poppet valves 50 and 52 are active and the shifter 4 is in the direct drive position, the vehicle runs in a forward direction with the low and reverse functions of the transmission inactive.

Also shown in this Figure are the distal end 26 of the valve rod 22 and the shift rod 30 distal end 34.

Figure 6:
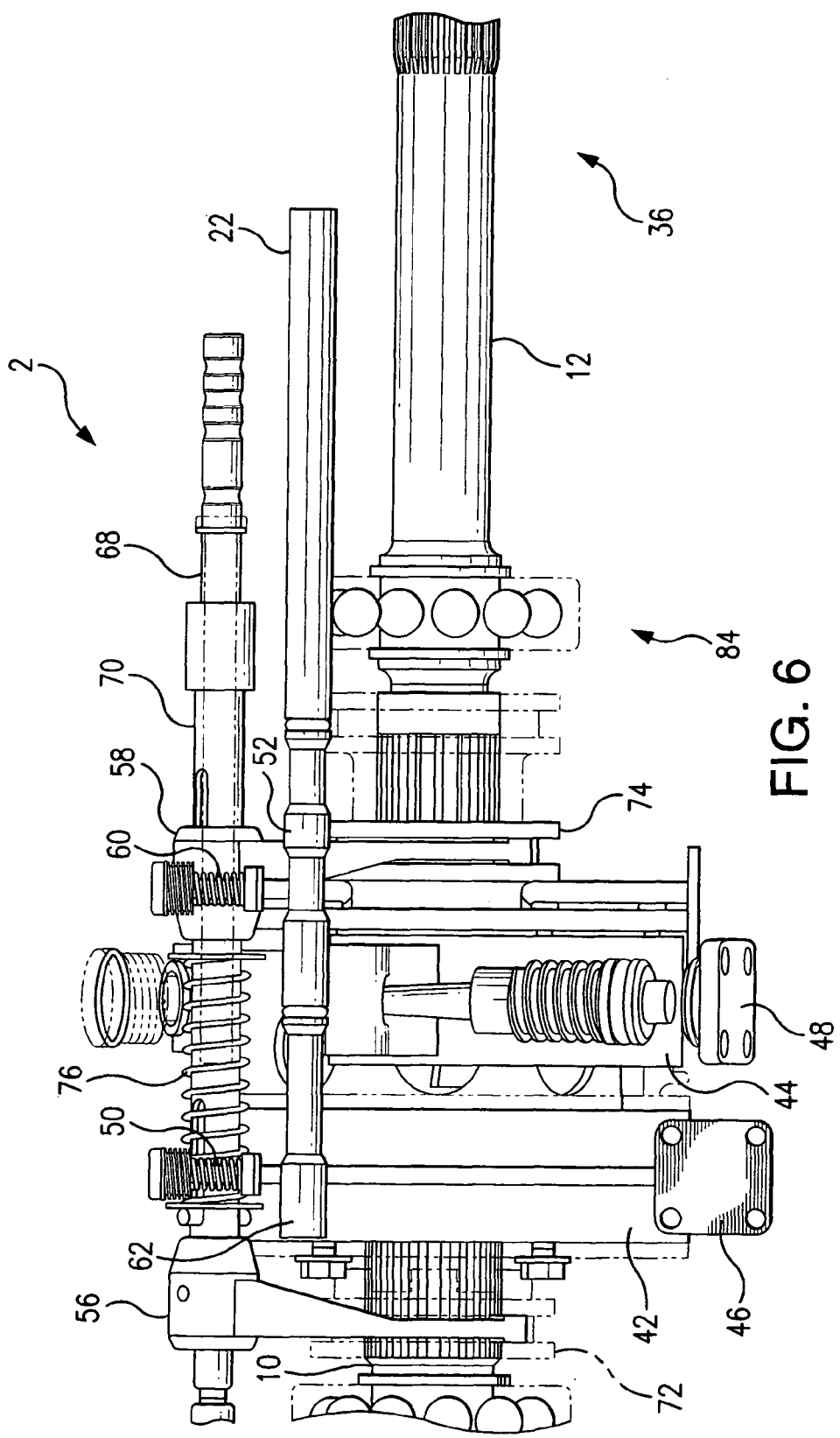
FIG. 6 is a full side view of the transmission with the housing missing, that shows a valve rod and outer and inner shift rod.

FIG. 6 shows the valve rod 22, outer 70 and inner 68 shift rod 30 that together show the shift rod 30 in more detail. This Figure shows the transmission 2 in reverse. One skilled in the art can ascertain the position of reverse because nodule 62 activates the poppet valve 50 it directs hydraulic pressure to the reverse cylinder 46 which in turn activates the reverse band 42 engaging or locking the planetary carrier 82 (not shown here) forcing the planetary ring gear 66 to run in reverse and drive the rear dog ring 74 and output shaft 12 in reverse, therefore driving the transmission 2 and the vehicle it is placed into in reverse.

Also shown in this figure are the shift rod 30 and its two component parts. The inner shift rod 68 travels inside of the outer shift rod 70 forming the shift rod 30. The rear shift fork 58 is directly driven by the shift rod 68 and positions the rear dog ring 74 in the gear selected, either reverse, low, neutral or direct drive. The fork 58 slides axially on the outer shift rod 70 but is axially fixed to the inner shift rod 68. When direct drive is selected the shift rod 30 is moved toward the distal end of the transmission 2, this position moves the front shift fork 56 to the farthest left hand position or toward the distal end 38 and moves the front dog ring 72 out of mesh with the sun gear 78 thus disconnecting the input shaft 10 entirely from the gear set 66. The shift rod 68 also moves the second shift fork 58 thus moving the rear dog ring 74 into mesh with the input shaft 10 thus coupling the input shaft 10 directly to the output shaft 12 and providing direct drive.

Moving the shift rod 30 in the opposite direction or to the right hand position or toward the near end of the transmission 2 moves the front shift fork 56 to the right further moving the front dog ring 72 into mesh with the sun gear 78 and moves the second shift fork 58 and thus the rear dog ring 74 into low gear position and moves the valve rod 22 to the low gear position. When hydraulic pressure is applied to the low cylinder 48 and applying low band 44 it locks planetary ring gear 64 and power flows from the input shaft 10, through the sun gear 78, through the planetary gears 66 which drive the planetary carrier 82, the rear dog ring 74 and the output shaft 12 in low gear.

Moving the shift rod 30 and therefore the valve rod 22 to the far right hand position or toward the near end of the transmission 2, or reverse, moves the shift rod 68, the second shift fork 58 and the rear dog gear 74 to the reverse position. The first shift fork 56 and the outer shift rod 70 remain in the low gear position while the inner shift rod 68 and the second shift fork 58 and rear dog ring 74 moves against the spring 76. When hydraulic pressure is applied the planetary carrier 82 is locked and power flows from the input shaft 10 through the sun gear 78 through the planetary gears set 66 which drive the planetary ring gear 64 and the rear dog ring 74 and the output shaft 12 in reverse.

This operation as shown in FIG. 5 is essential to the utility of the present invention in that most transmissions require a counter shaft to run the low and reverse aspects of a transmission. This invention reduces cost, maintenance, and provides the user with a lighter weight more efficient and durable transmission because the low and reverse components remain inactive while in direct drive. In racing, elimination of extra weight improves track performance.

Figure 7:
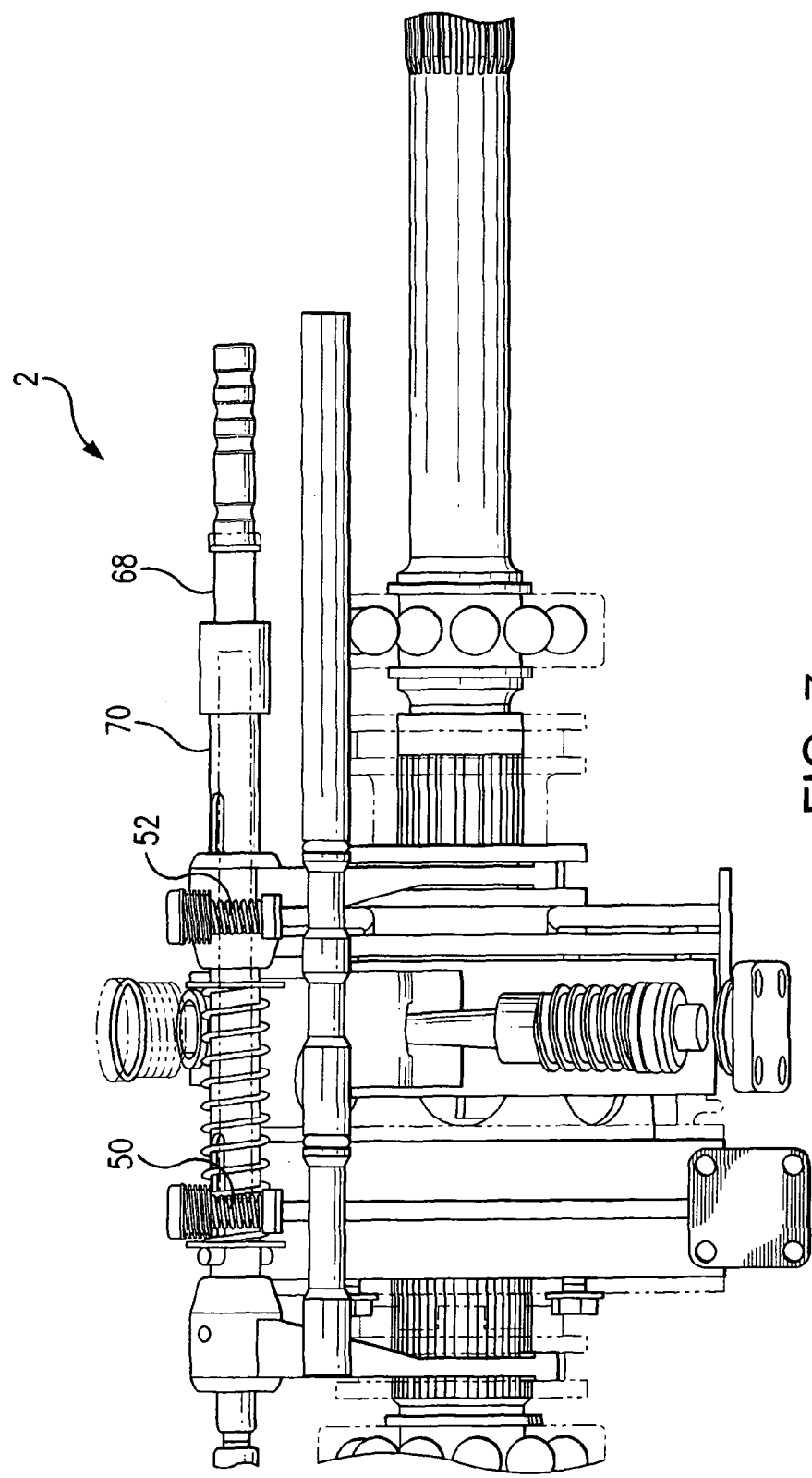
FIG. 7 shows the relationship between the inner and outer shifter rods with the bias spring.

FIG. 7 shows the relationship between the inner 68 and outer 70 shifter rods with the bias spring 76. Here the transmission is in neutral. There are no poppet valves 50 or 52 being activated and the low nodules 60 and 62 are not being activated. The front dog ring 72 is also not engaged. The vehicle is not moving in either direction.

The purpose of the bias spring 76 is basically only to allow for over-travel, allowing the transmission to reach the reverse position.

Figure 8:
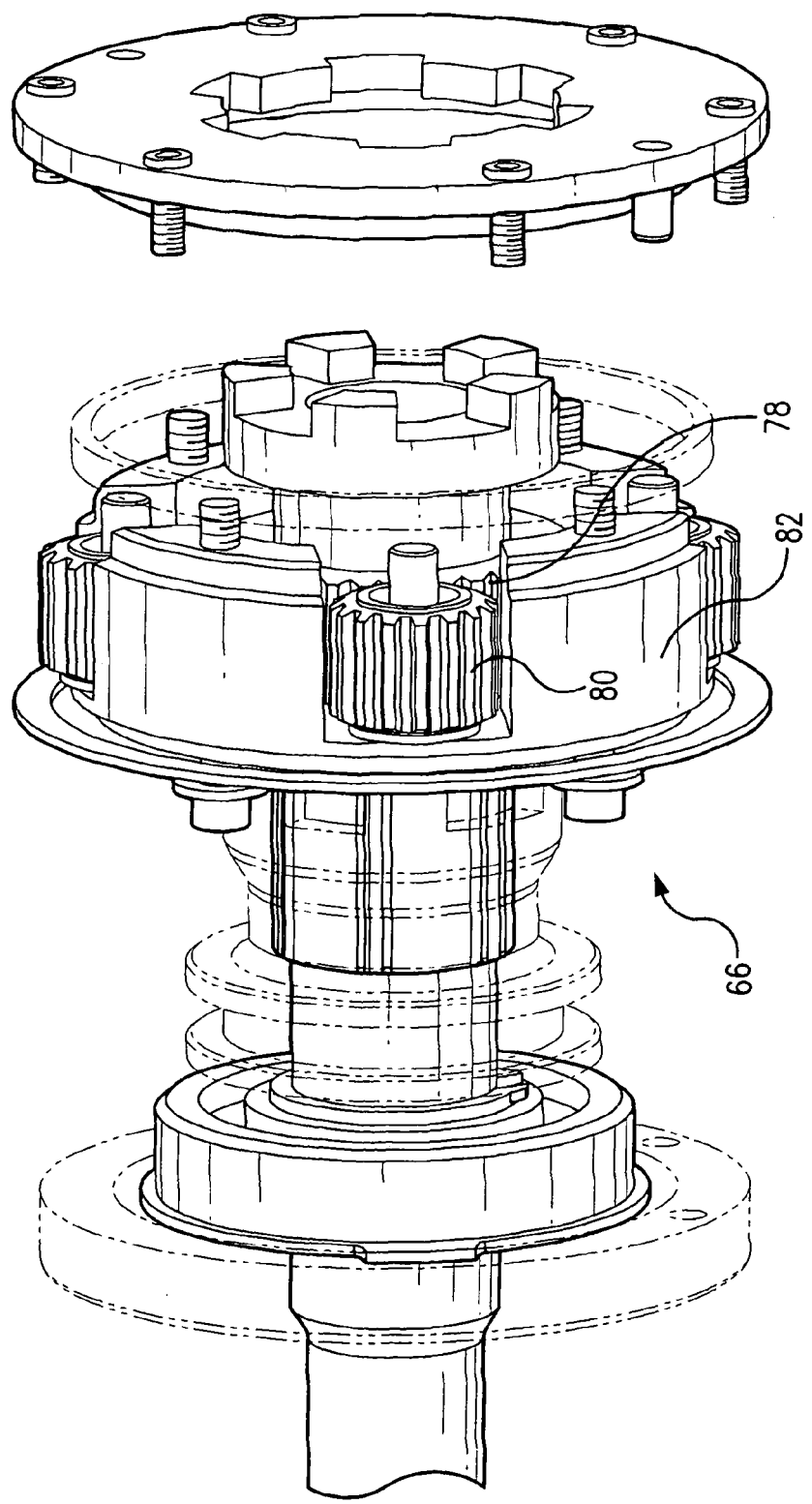
FIG. 8 shows the relationship between the input shaft, sun gear and the planetary gear set.

FIG. 8 shows the relationship between the input shaft 10, sun gear 78 and the planetary gear set 66. One skilled in the art will appreciate the fact that the sun gear 78 is the center of the planetary gear set 66 and is surrounded by smaller orbiting gears which are the planetary gears 80 and that on the outside edge of the planetary gear set 66 is an outer ring 64(shown in FIG. 9) or planetary ring gear 64 that engages or meshes with the planet gears 80. Also shown is the planetary gear carrier 82 holding the planetary gear set 66 together. This embodiment has a four planet gear 80 configuration. It should be clear to any one skilled in the art that any configuration of planet gear 80 to a sun gear 78 is acceptable, meaning a three gear series, a four gear series, a five gear series, etc. are all feasible without a variance from the spirit of the present invention.

Figure 9:
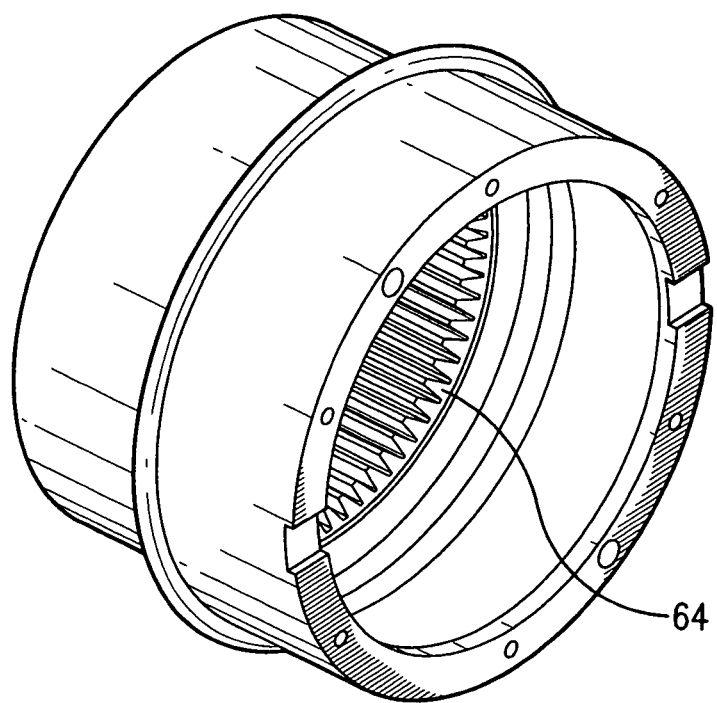
FIG. 9 shows the planetary ring gear.

FIG. 9 shows the planetary ring gear 64. This has been explained in the previous Figures.

Figure 10:
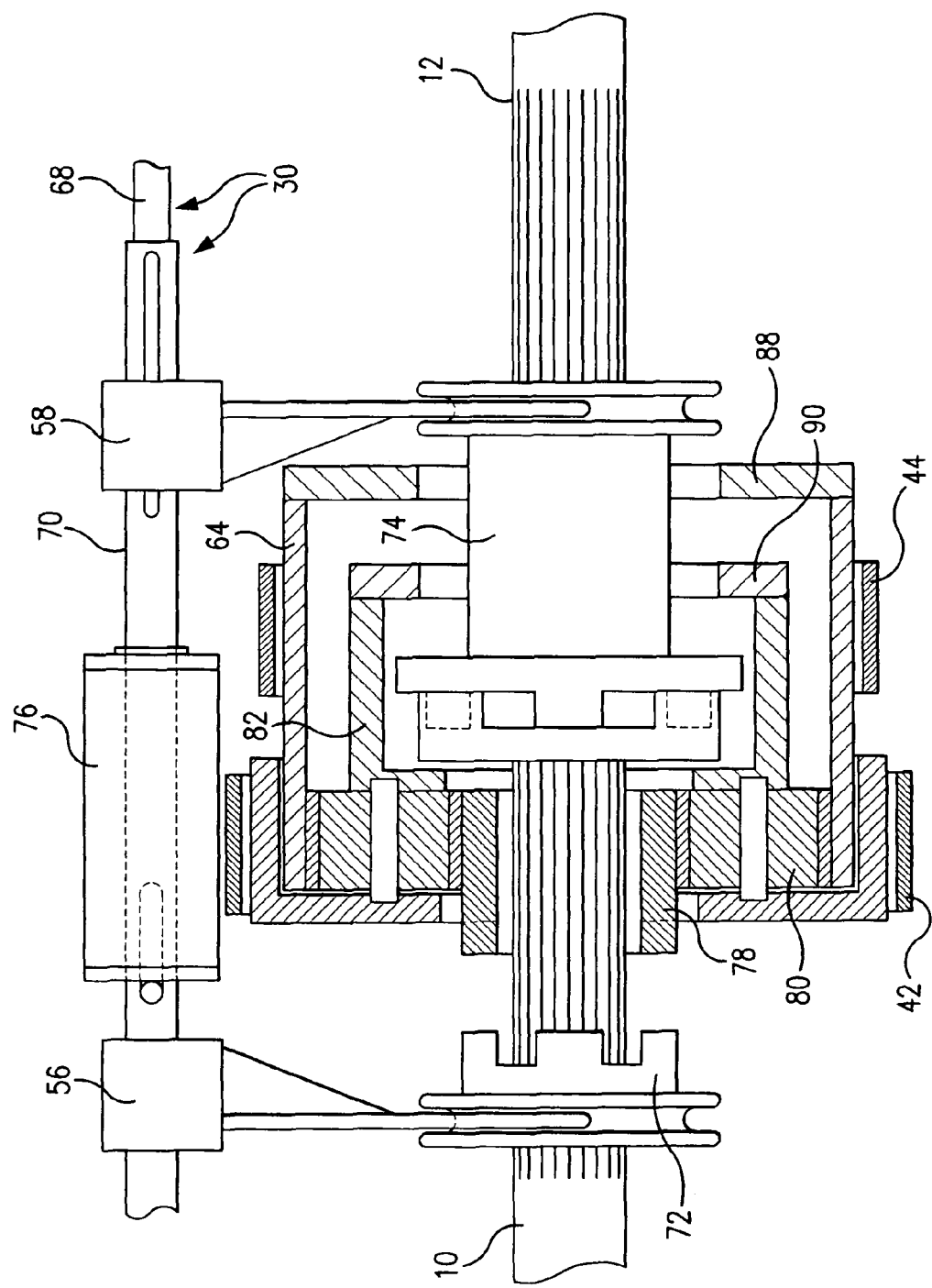
FIG. 10 shows the transmission internally in direct drive.

FIG. 10 shows the transmission 2 internally in direct drive. The rear dog ring 74 is positioned in the far left hand position which couples the input shaft 10 directly to the output shaft 12. The front dog ring 72 is also positioned in the far left hand position which uncoupled the sun gear 78 from the input shaft and prevents any power being transmitted by the planetary gear set 66.

Figure 11:
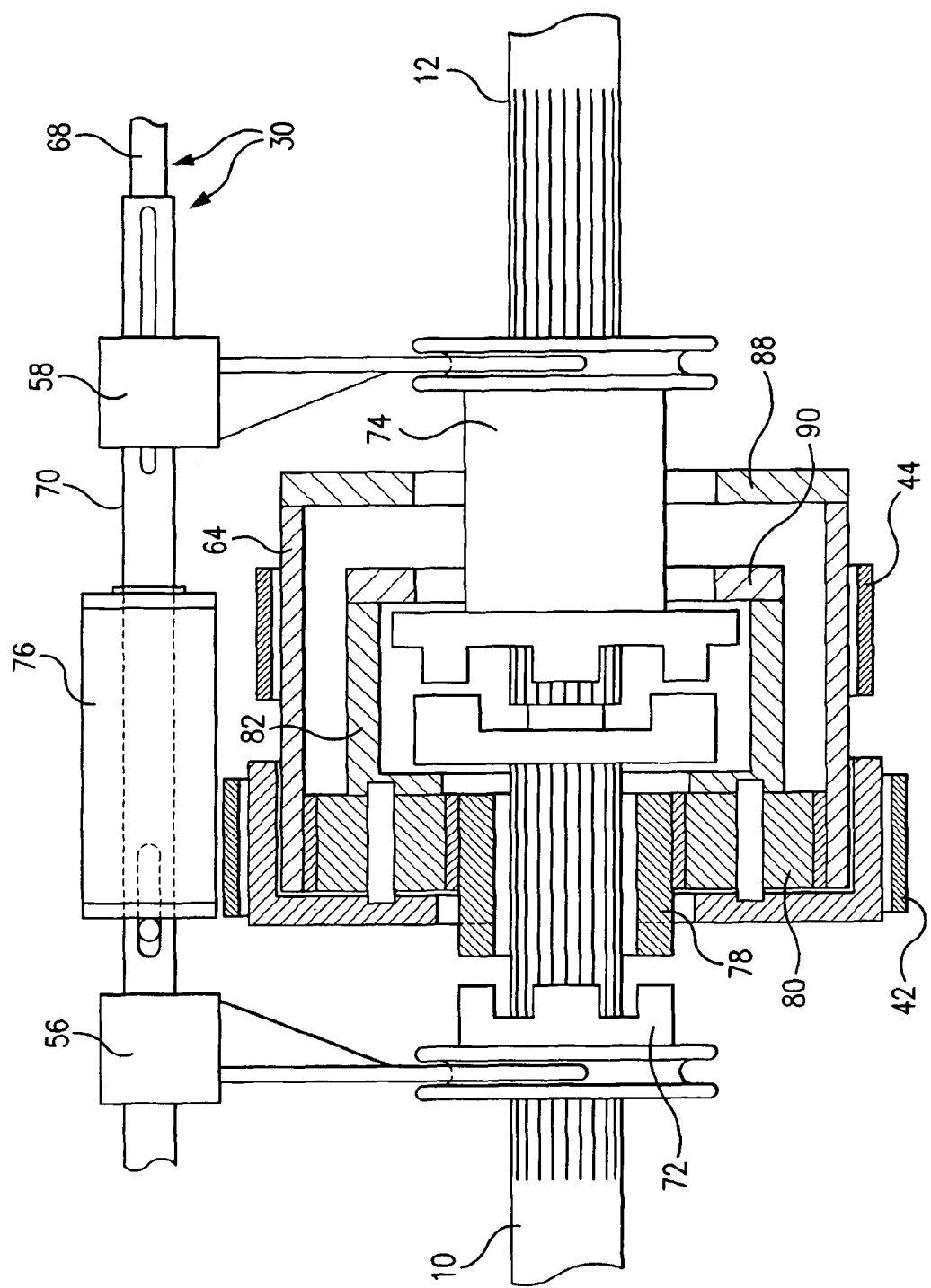
FIG. 11 shows the transmission internally in the neutral position.

FIG. 11 shows the transmission 2 internally in the neutral position. The shift rod 30, the shift forks 56 and 58, the front dog ring 72 and the rear dog ring 74 have been moved slightly to the right from the direct drive position. This movement has disengaged the rear dog ring 74 from the input shaft 10 so that there is no power being transmitted to the output shaft 12.

Figure 12:
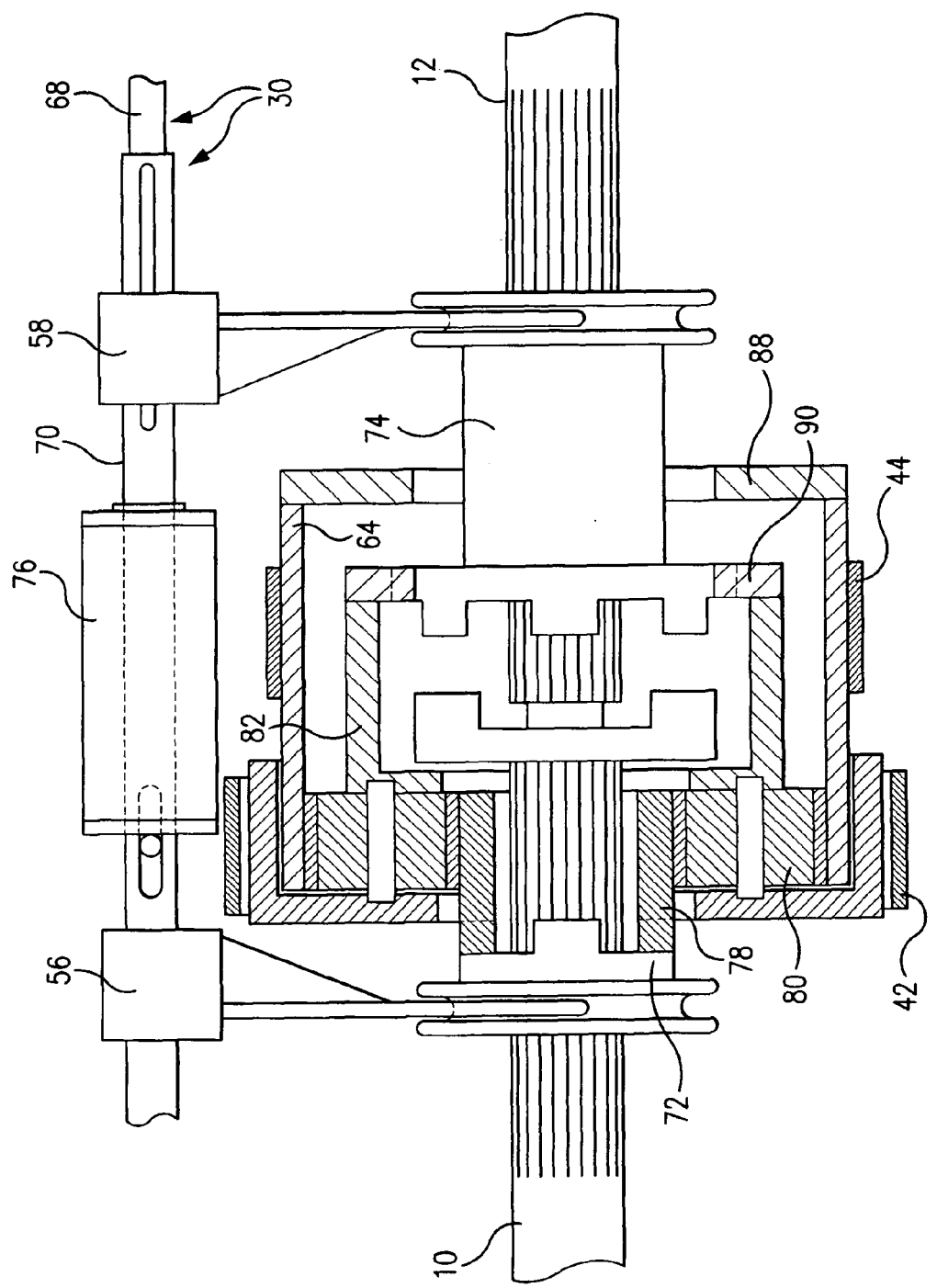
FIG. 12 shows the transmission internally in the low gear position.

FIG. 12 shows the transmission 2 internally in the low gear position. The shift rod 30, the shift forks 56 and 58, the front dog ring 72, and the rear dog ring 74 have been moved to the right from the neutral position. The front dog ring 72 has been moved into mesh with the planetary sun gear 78. The rear dog ring 74 has been moved into mesh with the low gear drive plate 90. The second band or low gear band 44 has been applied to lock the planetary ring gear 64, forcing the planetary carrier 82 to rotate and drive the rear dog ring 74 in the forward direction, which drives the output shaft 12 in the forward direction.

Figure 13:
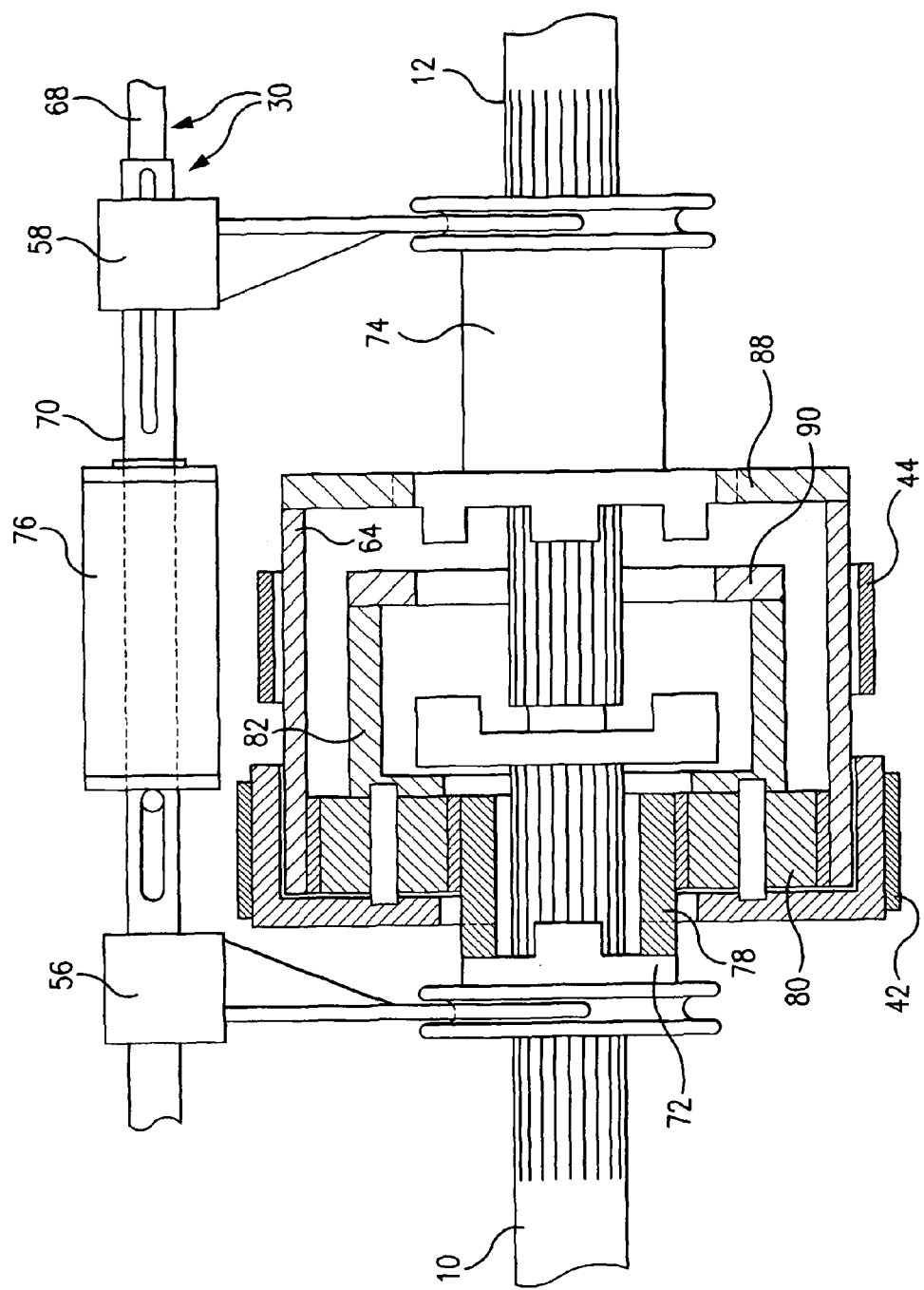
FIG. 13 shows the transmission internally in the reverse position.

FIG. 13 shows the transmission 2 internally in the reverse position. The inner shift rod 68, rear shift fork 58, and rear dog ring 74 have moved to the right from the low gear position, leaving the front shift fork 56, the outer shift rod 70 and the front dog ring 72 in the same position as the low gear position by compressing the bias spring 76, and moving the rear dog ring 74 into mesh with the reverse drive plate 88. The first band 42 or reverse band has been applied to lock the planetary carrier 82, forcing the planetary ring gear 64 to drive the reverse drive plate 88 and the rear dog ring 74 in reverse, which drives the output shaft 12 in reverse.

What is claimed is:

1. An automotive transmission, said transmission comprising:
    i. a housing;
    ii. supported within said housing,
    an input shaft and an output shaft, said input shaft driven by a power source;
    iii. slidably mounted on said input shaft, a front drive dog ring;
    iv. slidably mounted on said output shaft, a rear drive dog ring;
    v. a first gear housing, and contained in said first gear housing, a planetary gear housing and carrier, a planetary gear set comprising a central sun gear rotatably mounted on said input shaft, and at least three planet gears surrounding the sun gear, said planetary gear housing and carrier being covered by a circumferential first ring gear having internal surface gears that mesh with the planet gears;
    vi. said planetary gear set being activated by a first hydraulically driven control cylinder that applies a first band on a low gear drum that incorporates the planetary ring gear providing low gear;
    vii. said planetary gear set being activated by a second hydraulically driven control valve and cylinder that applies a second band on a reverse gear drum that incorporates the planetary carrier providing reverse gear;
    viii. said front dog ring engages the planetary sun gear to drive said planetary gear set when reverse or low is selected; said front dog ring is driven by said input shaft; said front ring dog disengages when direct drive is selected bypassing said planetary gear set;
    ix. said rear dog ring is surmounted on said output shaft and further drives said output shaft; said rear dog ring is activated by a shift lever selecting low gear position, reverse gear position, neutral position and direct drive position; when said direct drive position is selected said rear dog ring is disengaged from said planetary gear set;
    x. a valve rod having a near end;
    xi. a shift rod, said shift rod comprised of an inner shaft having a middle portion and an outer shell, said shift rod having a distal end and a near end, said valve rod and shift rod being fixedly attached to each other at the respective near ends;
    xii. said valve rod having predetermined nodules along an outside surface thereof;
    xiii. said shift rod outer shell rod being spring biased at the near end;
    xiv. said shift rod outer shell having a first shift fork assembly mounted at the distal end, the shift fork of said first shift fork assembly being engaged to the front dog ring;
    xv. said shift rod inner shaft having mounted near the middle portion, a second shift fork assembly, the shift fork of said second shift fork assembly being engaged to the rear dog ring; said second shift fork being slidably mounted on said outer shift rod;
    xvi. a first poppet valve activated by the positioning of the valve rod nodules for controlling the flow of hydraulic fluid to the circumferential first band cylinder, and a second poppet valve for controlling the flow of hydraulic fluid to the circumferential second band.

2. An automotive transmission, as claimed in claim 1 wherein said transmission is mechanically controlled.

3. In combination, an automotive racing transmission, as claimed in claim 1 and a vehicle that is self propelled.

* * * * *